Oct. 2, 1923.  
E. MÖLLER ET AL  
1,469,275  
APPARATUS FOR ELECTRICAL PRECIPITATION OF SUSPENDED PARTICLES FROM GASES  
Filed Jan. 16, 1922
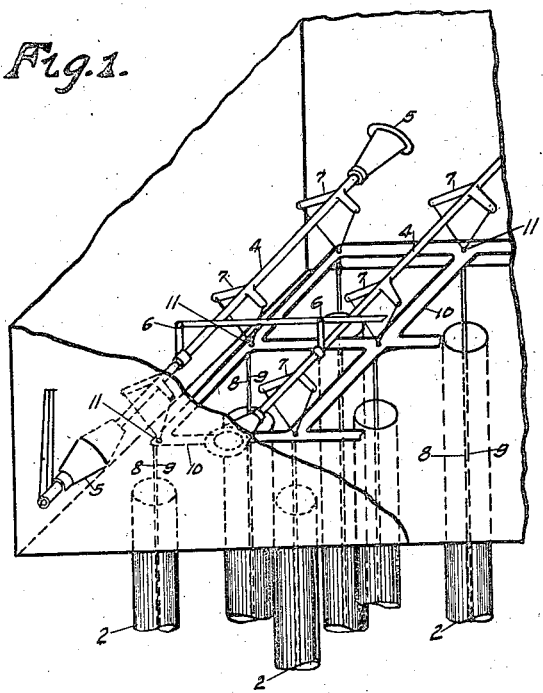
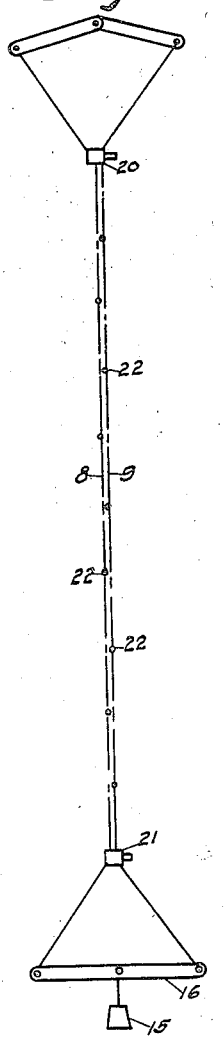
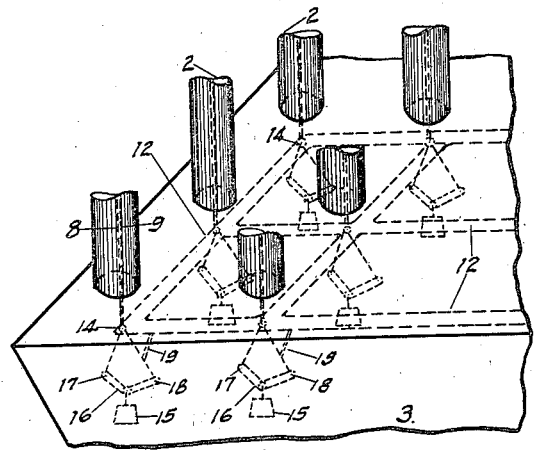
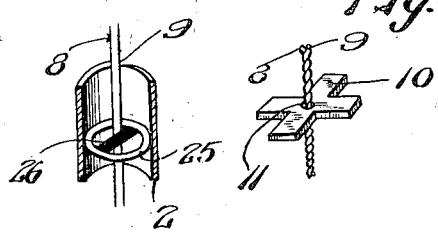
INVENTORS:  
Erwin Möller  
Wilhelm Hoss  
BY Arthur P. Knight.  
ATTORNEY.

Patented Oct. 2, 1923.

1,469,275

UNITED STATES PATENT OFFICE.

ERWIN MÖLLER, OF BRACKWEDE, AND WILHELM HOSS, OF BAD HOMBURG, GERMANY, ASSIGNORS TO INTERNATIONAL PRECIPITATION COMPANY, OF LOS ANGELES, CALIFORNIA, A CORPORATION OF CALIFORNIA.

APPARATUS FOR ELECTRICAL PRECIPITATION OF SUSPENDED PARTICLES FROM GASES.

Application filed January 16, 1922. Serial No. 529,662.

*To all whom it may concern:*

Be it known that we, ERWIN MÖLLER and WILHELM HOSS, citizens of Germany, residing, respectively, at Brackwede, in Westphalia, and Bad Homburg, vor der Hoehe, in Hessen-Nassau, Germany, have invented a new and useful Improvement in Apparatus for Electrical Precipitation of Suspended Particles from Gases, of which the following is a specification.

The main object of the present invention is to provide simple and effective means for removing from the discharge electrodes of an electrical precipitator material collecting thereon in the operation of the precipitator. Arrangements which are intended to dislodge the deposited dust from discharge electrodes by mechanical jarring have, in many cases, failed to operate effectively on account of the fact that only a limited jarring action can be produced without injury to the rigidity of the discharge electrode and the insulators carrying the same.

According to this invention, the cleaning of the discharge electrodes is effected by causing two or more contacting discharge elements (wires, rods, strips, or the like, bare, or insulated) to move on one another in such manner that they mutually remove the layer of dust, or deposited material from each other. The movement of the electrode elements may be lengthwise of the said elements, or, in any given case, the electrode elements may also be adapted for rotation around their longitudinal axes, so that the entire surface of the separate discharge elements can be subjected to the desired cleaning action. In order to guide the discharge elements in their movement on one another rings, or other guiding means, may be provided that also operate as scraping means. Furthermore, along the length of each discharge element there may be distributed enlargements, knots, or the like, which serve to rub off the dust deposited in the movement of the discharge elements on one another.

The invention is applicable as well to gas purification apparatus with tubular collecting electrodes as to those with plate collecting electrodes and can be carried out in detail in various ways.

The accompanying drawings illustrate embodiments of the invention, and referring thereto:

Fig. 1 is a partly broken perspective view of a form of the invention in which the collecting electrodes consist of vertical pipes and each discharge electrode consists of two vertical wires which are rubbed on one another to dislodge deposited material therefrom;

Fig. 2 is a side elevation of a modified form of a discharge electrode such as used in the form of the invention shown in Fig. 1.

Figs. 3 and 4 are broken perspective views, partly in section, of modified forms of the invention.

The form of the invention shown in Fig. 1 comprises a plurality of vertical tubular collecting electrodes 2 connected at their upper ends to a header portion 1 of an electrical precipitator and at their lower ends to a header 3, suitable means being provided for conducting the gas to be treated to one of these headers and leading the gas from the other of said headers so that the gas is caused to be passed through the tubular collecting electrodes 2. Shafts 4 are mounted in the upper header 1, being journalled in insulators 5 and connected together by arms 6 on said shafts and links 23 connecting said arms. One of said shafts 4 is provided with an operating arm 24 outside of the header 1 for operation of the said shafts. Two arms 7 are mounted on each shaft 4 above each vertical tubular collecting electrode 2, said arms extending in opposite directions and having connected, respectively, to their outer ends two discharge electrode elements 8 and 9 consisting, for example, of wires, or other flexible conductors. Before passing into the tubular electrode 2 the wires 8 and 9 pass through openings 11 in an insulated frame 10 and are thereby maintained in contact with each other. In the lower header 3 is provided a similar frame 12 having holes 14 through which the double wires 8 and 9 pass. The tensioning of both wires 8 and 9 is effected by a weight 15 that is hung from the middle of a double armed member 16. Stays 19 hold the frame 12 against lateral displacement.

As will appear from the drawing, it is only necessary to turn the shaft 4 from side to side by hand, or by the use of a motor, either continually or from time to time, to effect a rubbing of the electrode wires 8 and 9 on one another, thereby bringing about the cleaning thereof.

As shown in Fig. 3 either one of the discharge electrode members, for example, the member 8, may be provided with a ring 25 connected thereto by suitable insulating means 26 and adapted to slide within the tubular collecting electrodes 2 to guide the discharge electrodes and also serve to scrape and clean the collecting electrodes; furthermore, the longitudinal movement of the electrode elements may be combined with an axial movement thereof. For this purpose as shown in Fig. 4 the wires 8 and 9 may be formed as twisted members, such as wire cord, and the holes in the frames 10 and 12 through which the wires pass may fit the twisted wires or cords so as to cause the latter to turn as they are drawn through said holes.

In the form of the invention shown in Fig. 2 the discharge electrode elements 8 and 9, consisting of wires, or the like, are provided with enlargements, lugs, or knots 22, which in the movement of the wires on one another wipe off the dust deposit. In this form of the invention the retaining frames 10 and 12 are omitted and instead thereof rings 20 and 21 are provided on the wire 8 and the wire 9 passes through said rings. Otherwise the operation is the same as above described.

What we claim is:

1. An electrical precipitator comprising collecting electrodes and discharge electrodes, each discharge electrode comprising a plurality of electrode elements contacting with one another, and means for moving said electrode elements on one another to cause deposited material to be dislodged therefrom.

2. An apparatus, as set forth in claim 1, in which one of said discharge electrode elements is provided with enlargements for rubbing the contacting electrode element in the relative motion of said electrode elements.

3. In an electrical precipitator a discharge electrode comprising two electrode elements, each consisting of a flexible conductor, guiding means for holding said electrode elements in contacting position, an operating shaft, arms connected to said shaft and extending oppositely therefrom, said arms being connected, respectively, to said electrode elements at one end of said elements, and means connected to the other end of said electrode elements to tension the same.

4. A construction, as set forth in claim 3, in which said tensioning means comprises a member having its opposite ends connected, respectively, to said electrode elements and a weight hung on said member.

ERWIN MÖLLER.
WILHELM HOSS.